Dec. 6, 1927. 1,651,864
R. BERNHARD
OILING DEVICE
Filed March 14, 1927  3 Sheets-Sheet 1

Dec. 6, 1927. 1,651,864
R. BERNHARD
OILING DEVICE
Filed March 14, 1927 3 Sheets-Sheet 2
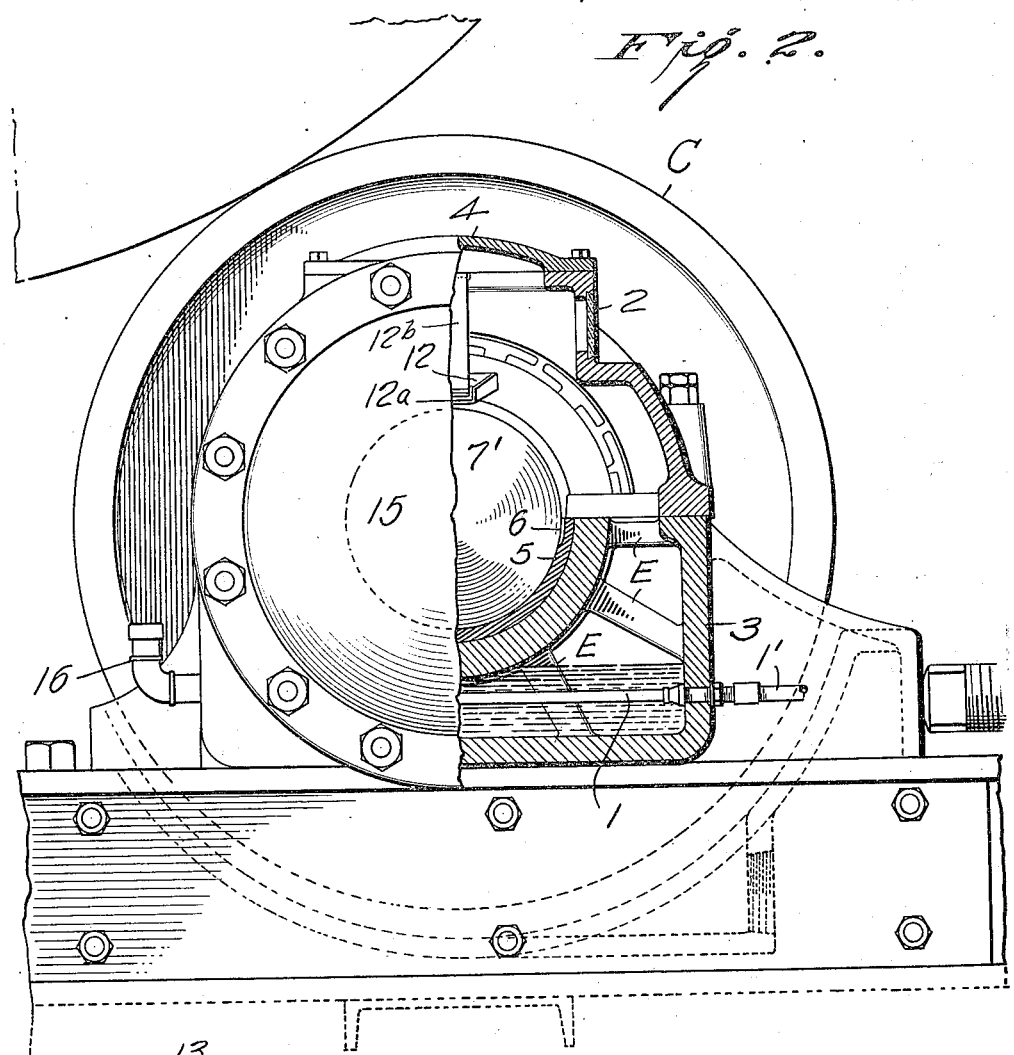
Fig. 2.
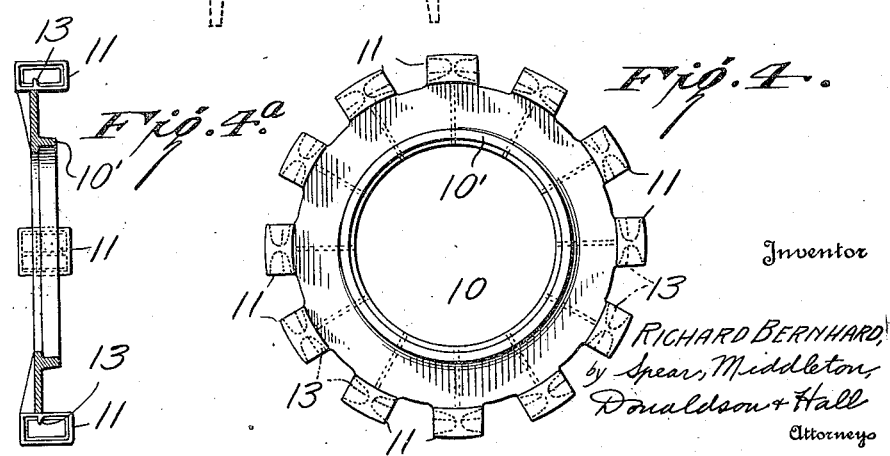
Fig. 4ᵃ. Fig. 4.
Inventor
RICHARD BERNHARD,
by Spear, Middleton,
Donaldson & Hall
Attorneys Dec. 6, 1927.

R. BERNHARD

OILING DEVICE

Filed March 14, 1927

Inventor

RICHARD BERNHARD,

By Spear, Middleton, Donaldson & Hall

Attorneys

Patented Dec. 6, 1927.

1,651,864

UNITED STATES PATENT OFFICE.

RICHARD BERNHARD, OF ALLENTOWN, PENNSYLVANIA, ASSIGNOR TO TRAYLOR ENGINEERING & MANUFACTURING COMPANY, OF ALLENTOWN, PENNSYLVANIA, A CORPORATION OF DELAWARE.

OILING DEVICE.

Application filed March 14, 1927. Serial No. 175,371.

This invention relates to an oiling device for slow moving bearings.

An object of this invention is to supply oil to the bearing continuously. The invention is especially applicable to shafts, rotating slowly, such as are used on rollers which support cement kilns, revolving dryers, and the like. These bearings are subject to tremendous pressure and heretofore they were lubricated with grease. This proved to be expensive because due to the heat some of it would melt and run out.

Another object is to do away with the necessity for exposing the bearing when replenishing or re-packing the bearing with grease, which would sometimes allow grit to enter the bearing on account of the dusty condition of the room in which the bearing is located.

The bearings are entirely sealed so no grit or any foreign substance can enter them. It is not necessary to replenish the oil but once in three to six months depending on the character of the service.

The invention consists in the features, combination, and arrangement of parts hereinafter described and particularly pointed out in the claims.

In the drawings

Fig. 2 is a cross section through the bearing on the line 2—2.

Fig. 3 is a plan view of the cooling coil.

Fig. 4 is a side elevation of the oil wheel, showing a slightly modified form of buckets.

Fig. 4$^a$ is a section through the oil wheel.

Figure 5:
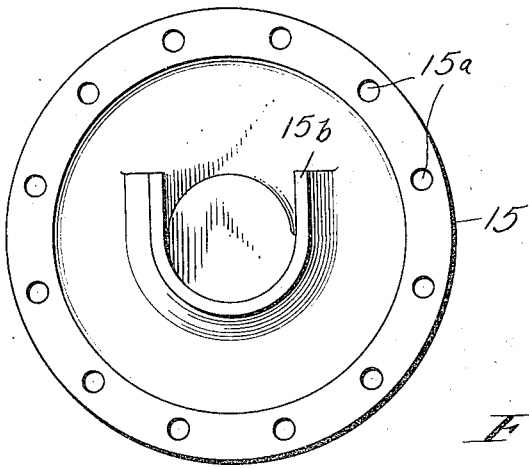

Fig. 5 is a view of the inner face of the end cap for the bearing member.

Figure 6:
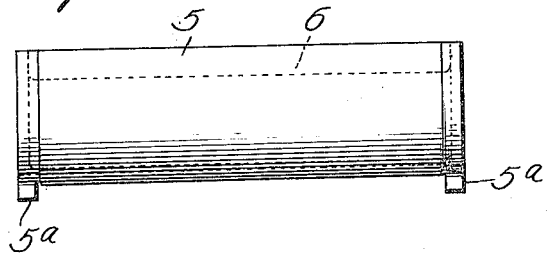
Figure 7:
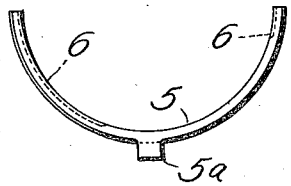

Figs. 6 and 7 are views of the bearing bushing showing the oil wells.

Figure 8:
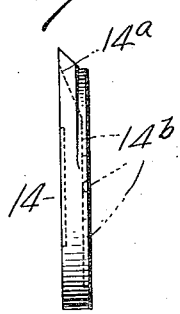
Figure 9:
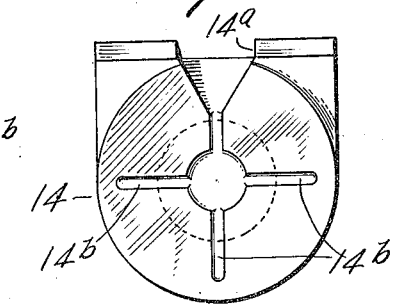

Figs. 8 and 9 are views of the thrust washer.

Figure 10:
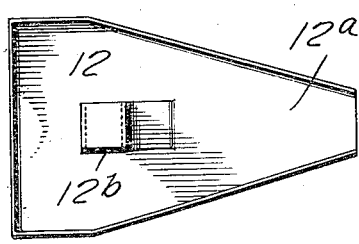
Figure 11:
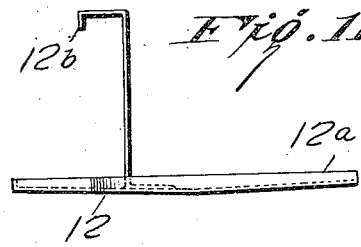

Figs. 10 and 11 are views of the oil tray.

With reference to the drawings:

A roller C upon which the tire of the rotary kiln shell or the like is to rotate has a shaft 7 with oppositely extending journals 7' adapted to bear upon and to rotate in bearings 3' of bearing members or boxes 3. Each bearing member 3 has a top cap 4 and an end cap 15.

In the bottom of the bearing member an oil reservoir A is provided which is adapted to be filled with lubricant. A copper cooling coil such as shown at 1 is placed in the reservoir near the surface of the oil so that upon circulation of cooling liquid through the coil, the hot lubricant will be chilled to retain its lubricating qualities. The coil has inlet and outlet pipes at 1'. The reservoir A is disposed between the bottom of the bearing member 3 and the bearing 3' which bearing is of semi-cylindrical shape and is located above the bottom of the bearing member and is connected thereto by struts or bars E.

The top cap 4 of the bearing is provided with a pair of peep holes 2 which are placed one on each side of the journal 7', opposite to each other, and are fitted with glass. It is therefore possible to observe the lubrication of the journal and to see the circulation of the oil. At night this may readily be observed by holding a light on one side at the peep hole 2 and looking into the bearing from the other. The condition of the journal may therefore be observed without exposing the bearing to the possibility of the entrance of grit or dust.

The bearing 3' is provided with a phosphor-bronze liner or bushing 5 which has oil wells 6 formed therein, one on each side of the journal. The bushing 5 at its ends has downwardly disposed lugs 5$^a$ which fit into notches 5$^b$ in the ends of bearing 3'.

The bearing is sealed at the roller hub B of roller C by means of a ring 8 which has a sliding fit in the hub and which is kept in contact with the end of the bearing by means of springs 9 which are disposed at intervals about the ring in the groove 9'.

The shaft or journal 7' is provided with an oil wheel 10 secured thereto to rotate therewith. Wheel 10 is of plate or web formation with an annular flange 10' embracing the end of the journal and with buckets 11 formed in the wheel and disposed at spaced intervals around its periphery. The lowermost portion of the wheel is always submerged in the oil. As the wheel rotates with the shaft, the oil is lifted and then delivered into the spout 12 of oil tray 12$^a$ along which tray it is conveyed and delivered substantially at the center of the journal 7'. A tray supporting bracket 12$^b$ extends upwardly from the tray into engagement with the bearing member 3 where it is clamped in position by top cap 4. The oil then runs down the shaft and into the wells 6 of the bronze liner 5. The wells 6 are always full of lubricant because the supply furnished by the oil wheel is always greater than is necessary to form and maintain the film between the shaft and the bearing. There is, therefore, quite a large overflow of oil. This overflow together with the lubricant which formed the film run back into the reservoir A to be again lifted and recirculated. The reservoir is of sufficient size so that the oil has an opportunity to settle whatever grit may be abraded from the bearing.

The buckets as shown at 11 are constructed to provide for lifting of the oil regardless of the direction of rotation of the shaft and wheel. That is the buckets each have oppositely disposed receptacles.

A rib as shown at 13 is provided in each bucket approximately in line with the web of the wheel. This rib serves to divide the discharge of the oil from each bucket so that the larger quantity of the contents of the bucket will be directed down the spout 12 to the journal, while the smaller quantity will be directed onto the thrust button or washer 14 for the shaft, which is held against the shaft by the end cap 15 of the bearing member or box 3.

The end cap 15 as shown in Fig. 5 is of disc-like form, and is provided with bolt holes 15ª about its periphery for the insertion of bolts to secure the cap to the bearing box. The cap 15 on its inner face is provided with a U-shaped flange or rib 15ᵇ which is adapted to receive and support the thrust washer 14.

The thrust washer or button 14 as shown in Figs. 8 and 9 is of plate or disc-like form. At the top the washer 14 is provided with a notched or tapered oil inlet 14ª which leads to diametrically disposed oil grooves 14ᵇ cut into the journal engaging face of the washer. The smaller quantity of the oil in a discharging bucket 11 will be directed, by means of rib 13, into the inlet 14ª and into the grooves 14ᵇ whereby the end of the journal 7' is kept constantly oiled, the used oil returning to the reservoir for settling.

Figure 1:
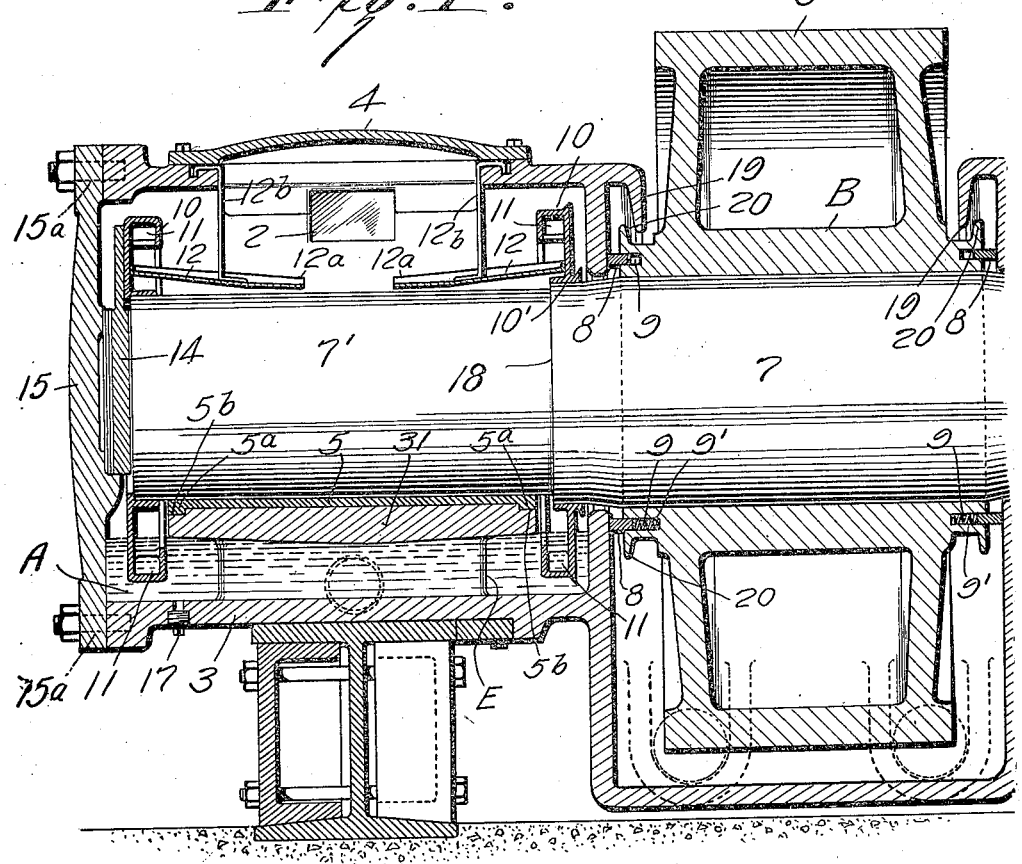
Figure 1 is a longitudinal vertical section through the apparatus along the axis of the roller shaft.

Automatic lubrication is thus provided for the thrust button contact with the end of the journal as well as for the bearing proper. This device operates with light as well as with heavy oils. There are no loose parts, no gears, and there is nothing to wear out since all moving contact surfaces are constantly supplied with fresh oil. The elevating device being located at the end of the shaft, does not interfere with the journal bearing in any way. On the larger journal it may be well to use two wheels 10, one on each end of the journal as shown in Fig. 1.

The base of the bearing member is provided with a filling and tell-tale pipe 16 to indicate the proper level for the lubricant. Drains 17 are also provided for removing the oil and for washing out the bearing.

The shaft is provided with a drip ring 18 which is formed integral therewith. This ring prevents the oil from running along the shaft and escaping at the hub of the roller. Wash water is prevented from washing grit into the bearing at the hub B of the roller by the dust flange 19 cast integral with the cap and by the drip flange 20 cast integral with the end of the roller hub.

The invention is not limited to the specific structure described, and various changes may be made within the scope of the invention. The oil wheel is shown mounted at the end of the shaft but it may, within the scope of the invention, be placed at the center of the bearing and deliver oil to each side thereof. This would be the construction on very long bearings. The shape of the buckets in Figs. 4 and 4ª is somewhat modified as compared to the buckets shown in Figs. 1 and 2.

I claim:

1. In an oiling device for shaft bearings, a bearing member having an oil reservoir in its bottom, said reservoir being disposed beneath the semi-cylindrical bearing of the bearing member, said bearing member having a downwardly disposed dust flange depending therefrom at its top to cooperate with an upwardly disposed drip flange integral with the hub of the rotating shaft in preventing the entrance of foreign matter into the oiled bearing, said bearing member having peep holes whereby the circulation of the oil may be observed, a bearing sealing ring disposed between the bearing member and the hub of the shaft to further guard against entry of foreign matter into the oiled bearing, and a water cooling coil mounted in said bearing member in the reservoir to cool the oil, said bearing member having an oil inlet and an oil outlet to the reservoir.

2. An oiling device for shaft bearings comprising a bearing member having an oil reservoir in its bottom, said reservoir being disposed beneath the semi-cylindrical bearing of the bearing member, an oil wheel having buckets disposed about its periphery, said wheel being adapted to be secured to the rotating shaft to rotate therewith and to be partly submerged in the oil in said reservoir whereby oil is continuously lifted above the bearing and rotating shaft, a thrust washer held against the end of the rotating shaft by the end cap of the bearing member, and means to distribute the oil to the bearing and thrust washer.

3. A device according to claim 2 in which the buckets of said oil wheel have oppositely disposed receptacles whereby oil will be conveyed regardless of the direction of rotation of the shaft, said oil wheel having ribs on its periphery dividing each of said bucket receptacles into a larger and a smaller compartment, whereby upon a filled bucket reaching its upper limit of travel the oil in the larger compartment will be delivered to the main bearing and the oil in the smaller compartment will be delivered to the thrust washer and to the end of the rotating shaft.

4. Apparatus according to claim 2 in which said thrust washer comprises a plate having a curved lower end and a square upper end, said upper end being notched to provide a downwardly tapering oil inlet, said plate having crossed diametrically disposed oil grooves on its inner surface, one of which is in communication with said inlet, whereby oil is distributed through the washer into contact with the end of the rotating shafts, said inlet being adapted to receive the oil discharged from said buckets.

5. In apparatus according to claim 2, an oil distributing spout disposed beneath the discharging buckets of the oil wheel and inclining downwardly and away from said buckets to a point midway of the length of the rotating shaft, said spout having an upwardly extending bracket adapted to be secured to said bearing member to support the spout.

In testimony whereof, I affix my signature.

RICHARD BERNHARD.